United States Patent
Kreider

[11] 3,910,945
[45] Oct. 7, 1975

[54] 2-(2-METHYL-5-NITRO-1-IMIDAZOLYL)ETHYL-N-ARYLALKYLDI-THIOCARBAMATES

[75] Inventor: Eunice M. Kreider, Chicago, Ill.

[73] Assignee: G. D. Searle & Co., Chicago, Ill.

[22] Filed: Oct. 29, 1973

[21] Appl. No.: 410,765

Related U.S. Application Data

[63] Continuation-in-part of Ser. No. 294,916, Oct. 4, 1972, abandoned.

[52] U.S. Cl. .............................. 260/309; 424/273
[51] Int. Cl.² ........................................ C07D 233/94
[58] Field of Search ................................. 260/309

[56] References Cited
UNITED STATES PATENTS
3,696,116   10/1972   Jeanmart et al. ................ 260/309

Primary Examiner—Norma S. Milestone
Assistant Examiner—C. M. S. Jaisle
Attorney, Agent, or Firm—Elliot N. Schubert; John J. McDonnell

[57] ABSTRACT

2-(2-Methyl-5-nitro-1-imidazolyl)ethyl esters of N-arylalkyldithiocarbamates of the formula

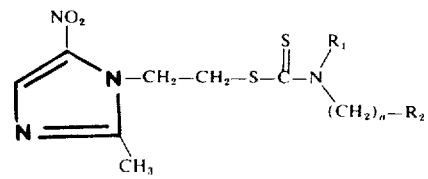

wherein n is an integer from 1 to 7, $R_1$ is hydrogen or lower alkyl, and $R_2$ is hetero or carbomonocyclicaryl. These compounds are anti-microbial agents. The compounds are prepared in 2 steps. The reaction of the appropriate amine with carbon disulfide in aqueous base forms the dithiocarbamate salt and the final products are formed by the reaction of this salt with 1-(2-chloroethyl)-2-methyl-5-nitroimidazole.

11 Claims, No Drawings

2-(2-METHYL-5-NITRO-1-IMIDAZOLYL)ETHYL-N-ARYLALKYLDITHIOCARBAMATES

This application is a continuation-in-part of my co-pending application Ser. No. 294,916 filed Oct. 4, 1972 now abandoned The present invention relates to a group of 2-(2-methyl-5-nitro-1-imidazolyl)ethyl-N-arylalkyldithiocarbamates having the following general formula

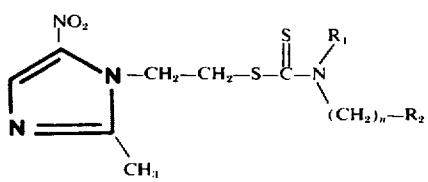

wherein $n$ is an integer from 1 to 7, $R_1$ is hydrogen or a lower alkyl radical, and $R_2$ is a hetero- or carbomonocyclicaryl radical, the latter being optionally substituted. Preferred embodiments of the present invention are those in which $n$ is 1 or 2, $R_1$ is hydrogen or a methyl radical, and $R_2$ is phenyl, furyl or substituted phenyl. Halogens, lower alkoxy, and lower alkyl radicals are typical phenyl substituents. The preferred substitutions are 2-fluoro, 4-chloro, 3,4-dichloro, 4-methoxy, 3,4-dimethoxy, and 3-methyl.

The compounds of the present invention are useful in view of their anti-microbial activity. They are especially effective in inhibiting the growth of protozoa and bacteria.

Evidence of the anti-protozoal utility of the present compounds is obtained from standardized tests designed to determine the capacity of test compounds to inhibit the growth of *Trichomonas vaginalis*. These tests are carried out in the following manner. A modified Diamond medium is prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate and 54,000 parts of distilled water. The pH is adjusted to 6.8 with 40% sodium hydroxide solution and 30 parts of agar (Baltimore Biological Laboratories) is incorporated. The mixture is boiled for one minute to dissolve the agar and is then sterilized in an autoclave. To 80 volumes of the resultant medium is aseptically added 20 volumes of sterile Dubos medium serum. The resultant medium is inoculated with 1% by volume of a 72 hour culture of *Trichomonas vaginalis*, whereupon 1 ml. of the inoculated medium is mixed with 10 mg. of test compound. The mixture is incubated anaerobically at 37°C. for 48 hours and then examined microscopically for the presence of motile trichomonads. If any are observed the compound is considered inactive. If no motile trichomonads are observed, 0.1 ml. of the incubated mixture is serially diluted and mixed wtih additional quantities of the inoculated medium sufficient to produce concentrations of 1000, 100, 10 and 1 micrograms of test compound per ml. and the resulting mixtures are incubated anaerobically as before at 37°C. for 48 hours and then examined microscopically for the presence of motile trichomonads. Controls are provided by concurrent incubation identical with the foregoing except for the absence of test compounds.

Further evidence of the antibacterial utility of the instant compounds is provided by standardized tests for their capacity to prevent the growth of *Bacillus subtilis* and *Escherichia coli*. In these tests, a mixture of 5 mg. of compound with 5 ml. of sterile nutrient broth is heated at 80°C. for 20 minutes, then cooled to around 25°C., and finally serially diluted and mixed with sufficient quantities of a mixture of sterile nutrient broth and 1% of a culture of either *Bacillus subtilis* or *Escherichia coli* to produce concentrations of approximately 400, 100, 25, and 6 mcgm. of compound per ml. The resultant mixtures are incubated for 20–24 hours at 37°C. Controls are provided by concurrent incubations identical with the foregoing excepting that no compound is present. Activity is determined by gross examination; and potency is expressed as the minimum concentration, in mcgm. of compound per ml., at which no growth of the test organism is discernible.

These compounds are prepared by the general approach shown in Scheme A.

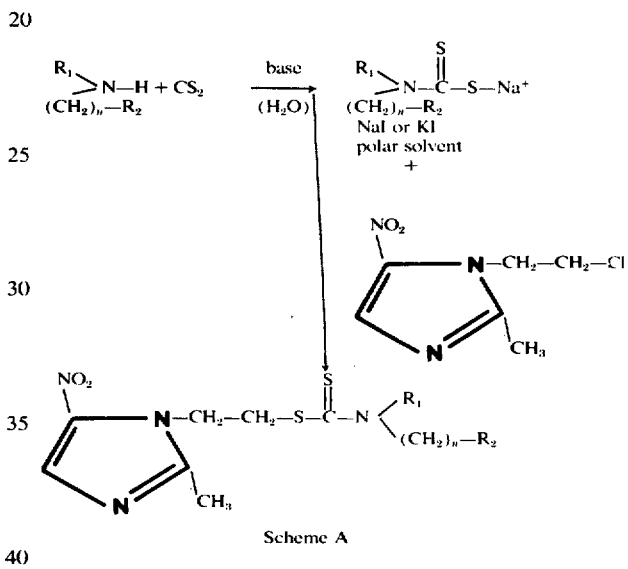

Scheme A

Carbon disulfide is added to an aqueous basic solution of a given amine and the resulting dithiocarbamate salt is isolated as shown in the first step of Scheme A. Solutions of dithiocarbamate salts in polar solvents and 1-(2-chloroethyl)-2-methyl-5-nitroimidazole, D. Welch and R. Vatne, *J. Med. Chem.*, 11, 370, (1968) are reacted in the presence of sodium or potassium iodide to form the corresponding 2-(2-methyl-5-nitro-1imidazolyl)ethyl-N-arylalkyldithiocarbamates as shown in the second step of Scheme A. For instance, when carbon disulfide is added to an aqueous sodium hydroxide solution of p-chlorobenzylamine, sodium-N-p-chlorobenzyldithiocarbamate is formed and when a solution of this salt in warm (50°) dimethylformamide or dimethylsulfoxide is reacted with 1-(2-chloroethyl)-2-methyl-5-nitroimidazole, 2-(2-methyl-5-nitro-1-imadazolyl)ethyl-N-p-chlorobenzyldithiocarbamate, is obtained.

The following examples are presented to further illustrate the present invention. They should not be construed as limiting it either in spirit or in scope. In these examples quantities are indicated in parts by weight unless parts by volume are specified, and temperatures are indicated in degrees Centigrade (°C.). The relationship between parts by weight and parts by volume is the same as that existing between grams and milliliters.

EXAMPLE 1

To a solution of 4 parts of sodium hydroxide in 10 parts by volume of water is added 13 parts of p-chlorobenzylamine. The solution is stirred in an ice bath during slow addition of 10 parts by volume of carbon disulfide. The reaction mixture is stirred in a cold bath until a heavy precipitate results. After cooling for an additional hour, the precipitate is filtered, washed with ether and vacuum dried. The resulting sodium N-p-chlorobenzyldithiocarbamate is used without further purification.

The solution of 47 parts of 1-(2-chloroethyl)-2-methyl-5-nitroimidazole and 1.04 parts of sodium iodide in 25 parts by volume of warm ( 50°) dimethylformamide is prepared and added to a solution of 6.0 parts of sodium N-p-chlorobenzyldithiocarbamate, is prepared above, in 25 parts by volume of warm ( 50°) dimethylformamide. The reaction mixture is stirred at room temperature under anhydrous conditions for 24 hours, diluted with 100 parts by volume of water and extracted with chloroform. The chloroform solution is washed with water and dried over anhydrous sodium sulfate. The sodium sulfate is filtered and the solution is concentrated to a volume of approximately 25 parts. The addition of 5 parts by volume of hexane followed by cooling provides a precipitate. The precipitate is isolated and dissolved in hot 50% ethyl acetate —50% hexane containing decolorizing charcoal. The solution is further heated and the charcoal is filtered. Cooling provides crystals of 2-(2methyl-5-nitro-1-imidazolyl)ethyl-N-p-chlorobenzyldithiocarbamate, melting at 138.5°–139°. The formula of this compound is

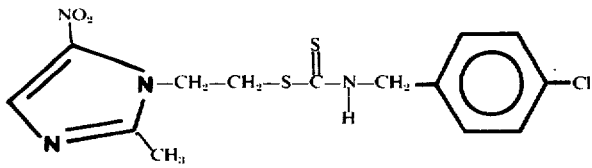

EXAMPLE 2

Sodium N-3,4-dichlorobenzyldithiocarbamate is prepared in the manner described in Example 1, using an equivalent quantity of 3,4-dichlorobenzylamine as the amine. A solution of 4.40 parts of this salt in 25 parts by volume of warm dimethylformamide is reacted with a solution of 1.40 parts of sodium iodide and 3.05 parts of 1-(2-chloroethyl)-2-methyl-5-nitroimidazole in 25 parts by volume of warm dimethylformamide, as described in Example 1. This procedure provides 2-(2-methyl-5-nitro-1-imidazolyl)ethyl-N-3,4-dichlorobenzyldithiocarbamate melting at 157°–158°. The formula for this compound is

EXAMPLE 3

Sodium N-p-methoxybenzyldithiocarbamate is prepared in the manner described in Example 1, using an equivalent quantity of p-methoxybenzylamine as the amine. A solution of 3.0 parts of this salt in 25 parts by volume of dimethylformamide is reacted with a solution of 1.25 parts of sodium iodide and 2.35 parts of 1-(2-chloroethyl)-2-methyl-5-nitroimidazole in 25 parts by volume of warm dimethylformamide, as described in Example 1. This procedure provides 2-(2-methyl-5-nitro-1-imidazolyl) ethyl-N-p-methoxybenzyldithiocarbamate, melting at 152°–153°. The formula for this compound is

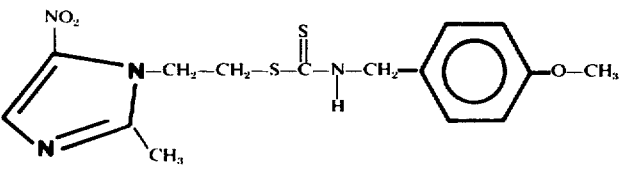

EXAMPLE 4

Sodium N-3,4-dimethoxybenzyldithiocarbamate is prepared in the manner described in Example 1, using an equivalent quantity of 3,4-dimethoxybenzylamine as the amine. A solution of 5.30 parts of this salt in 25 parts by volume of warm dimethylformamide is reacted with a solution of 1.74 parts of sodium iodide and 3.78 parts of 1-(2-chloroethyl)-2-methyl-5-nitroimidazole in 25 parts by volume of warm dimethylformamide, as described in Example 1. This procedure provides 2-(2-methyl-5-nitro-1-imidazolyl)ethyl-N-3,4-dimethoxybenzyldithiocarbamate, melting at 116°–117°. The formula for this compound is

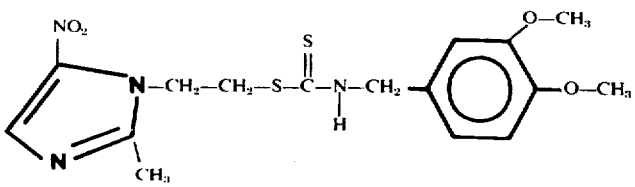

EXAMPLE 5

Sodium N-o-fluorobenzyldithiocarbamate is prepared in the manner described in Example 1, using an equivalent quantity of o-fluorobenzylamine as the amine. A solution of 3.12 parts of this salt in 25 parts by volume of warm dimethylformamide is reacted with a solution of 1.5 parts of sodium iodide and 2.27 parts of 1-(2-chloroethyl)-2-methylformamide, as described in Example 1. This procedure provides 2-(2-methyl-5-nitro-1-imidazolyl)ethyl-N-o-fluorobenzyldithiocarbamate, melting at 133.5°–134.5°. The formula for this compound is

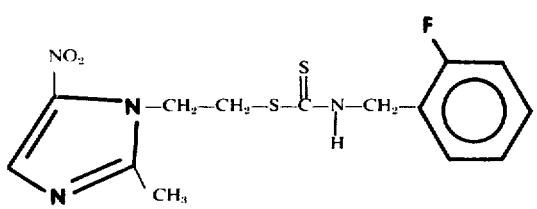

EXAMPLE 6

Sodium N-m-methylbenzyldithiocarbamate is prepared in the manner described in Example 1, using an equivalent quantity of m-methylbenzylamine as the amine. A solution of 2.96 parts of this salt in 25 parts by volume of warm dimethylformamide is reacted with a solution of 1.5 parts of sodium iodide and 2.27 parts of 1-(2-chloroethyl)-2-methyl-5-nitroimidazole in 25 parts by volume of warm dimethylformamide, as described in Example 1. This procedure provides 2-(2-methyl-5-nitro-1-imidazolyl)ethyl-N-m-methylbenzyldithiocarbamate, melting at 120°–122°. The formula for this compound is

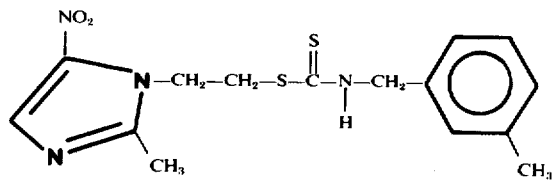

EXAMPLE 7

Sodium N-furfuryldithiocarbamate is prepared in the manner described in Example 1, using an equivalent quantity of furfurylamine as the amine. A solution of 3.90 parts of this salt in 25 parts by volume of warm dimethylformamide is reacted with a solution of 1.70 parts of sodium iodide and 3.78 parts of 1-(2-chloroethyl)-2-methyl-5-nitroimidazole in 25 parts by volume of warm dimethylformamide, as described in Example. This procedure provides 2-(2-methyl-5-nitro-1-imidazolyl)ethyl-N-furfuryldithiocarbamate, melting at 159°–160°. The formula for this compound is

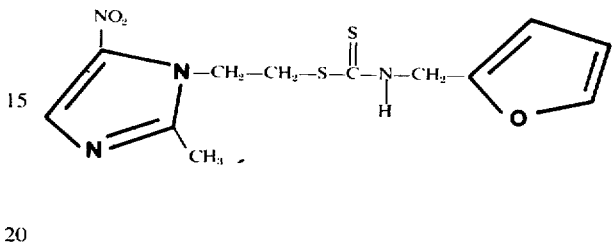

EXAMPLE 8

Sodium N-p-chlorophenethyldithiocarbamate is prepared in the manner described in Example 1, using an equivalent quantity of p-chlorophenethylamine as the amine. A solution of 3.65 parts of this salt in 25 parts by volume of warm dimethylformamide is reacted with a solution of 1.25 parts of sodium iodide and 2.73 parts of 1-(2-chloroethyl)-2-methyl-5-nitroimidazole in 25 parts by volume of warm dimethylformamide, as described in Example 1. This procedure provides 2-(2-methyl-5-nitro-1-imidazolyl)ethyl-N-p-chlorophenethyldithiocarbamate, melting at 156°–156.5°. The formula for this compound is

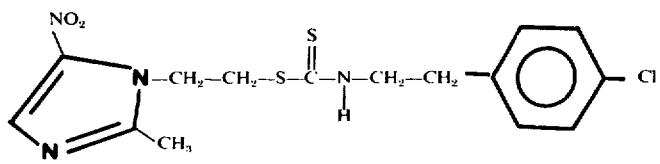

EXAMPLE 9

Sodium N-p-methoxyphenethyldithiocarbamate is prepared in the manner described in Example 1, using an equivalent quantity of p-methoxyphenethylamine as the amine. A solution of 5.0 parts of this salt in 25 parts by volume of dimethylformamide is reacted with a solution of 1.65 parts of sodium iodide and 3.78 parts of 1-(2-chloroethyl)-2-methyl-5-nitroimidazole in 25 parts by volume of warm dimethylformamide, as described in Example 1. This procedure provides 2-(2-methyl-5-nitro-1-imidazolyl)ethyl-N-p-methoxyphenethyldithiocarbamate, melting at 129°–130°. The formula for this compound is

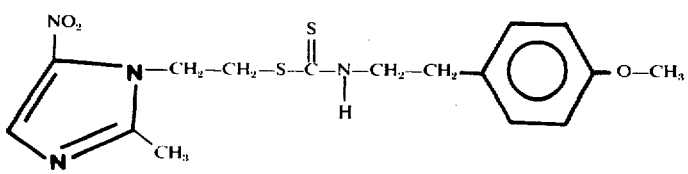

EXAMPLE 10

Sodium N-methylbenzyldithiocarbamate is prepared in the manner described in Example 1, using an equivalent quantity of N-methylbenzylamine as the amine. A solution of 4.38 parts of this salt in 25 parts by volume of warm diemthylformamide is reacted a solution of 1.72 parts of sodium iodide and 3.78 parts of 1-(2-chloroethyl)-2-methyl-5-nitroimidazole in 25 parts by volume of warm dimethylformamide, as described in Example 1. This procedure provides 2-(2-methyl-5-nitro-1-imidazolyl)ethyl-N-methyl-N-benzyldithiocarbamate, melting at 124°–125°. The formula for this compound is

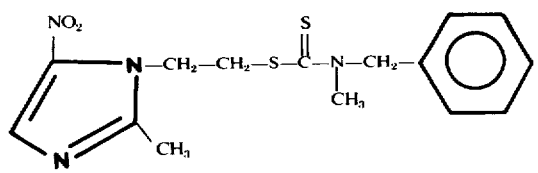

EXAMPLE 11

Sodium N-n-propyl-N-benzyldithiocarbamate is prepared in the manner described in Example 1, using an equivalent quantity of N-propylbenzylamine as the amine. A solution of 4.38 parts of this salt in 25 parts by volume of warm dimethylformamide is reacted with a solution of 1.72 parts of sodium iodide and 3.78 parts of 1-(2-chloroethyl)-2-methyl-5-nitroimidazole in 25 parts by volume of warm dimethylformamide, as described in Example 1. This procedure provides 2-(2methyl-5-nitro-1-imidazolyl)ethyl-N-n-propyl-N-benzyldithiocarbamate. The formula for this compound is

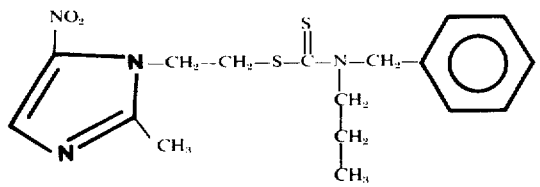

EXAMPLE 12

Sodium N-p-ethoxybenzyldithiocarbamate is prepared in the manner described in Example 1, using an equivalent quantity of p-ethoxybenzylamine as the amine. A solution of 3.0 parts of this salt in 25 parts by volume of warm dimethylformamide is reacted with a solution of 1.25 parts of sodium iodide and 2.35 parts of 1-(2-chloroethyl)-2-methyl-5-nitroimidazole in 25 parts by volume of warm dimethylformamide, as described in Example 1. This procedure provides 2-(2-methyl-5-nitro-imidazolyl)ethyl-N-p-ethoxybenzyldithiocarbamate. The formula for this compound is

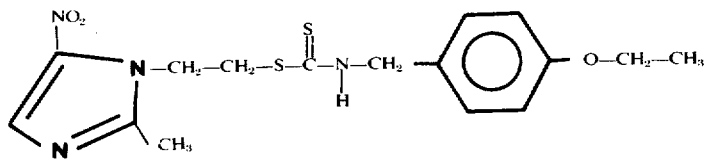

EXAMPLE 13

Sodium N-p-n-butylbenzyldithiocarbamate is prepared in the manner described in Example 1, using an equivalent quantity of p-n-butylbenzylamine as the amine. A solution of 3.2 parts of this salt in 25 parts by volume of warm dimethylformamide is reacted with a solution of 1.4 parts of sodium iodide and 2.6 parts of 1-(2-chloroethyl)-2-methyl-5-nitroimidazole in 25 parts by volume of warm dimethylformamide, as described in Example 1. This procedure provides 2-(2-methyl-5-nitro-imidazolyl)ethyl-N-p-butylbenzyldithiocarbamate. The formula for this compound is

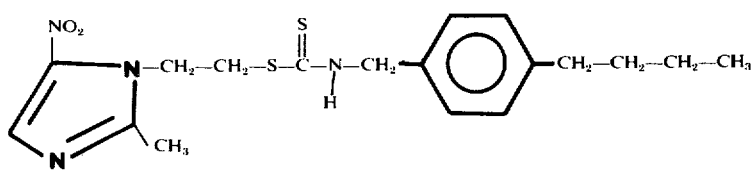

What is claimed is:

1. A compound of the formula

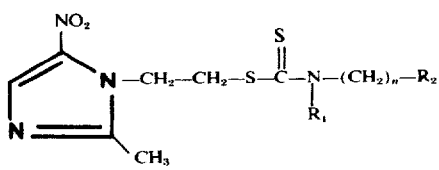

wherein $n$ is a positive integer from 1 to 7, $R_1$ is hydrogen or lower alkyl, and $R_2$ is phenyl, furyl or halophenyl containing 1 or 2 halo, (lower alkoxy)phenyl containing 1 or 2 lower alkoxy, or (lower alkyl)phenyl containing 1 lower alkyl.

2. According to claim 1, the compound which is 2-(2methyl-5-nitro-5-nitro-1-imidazolyl)ethyl-N-3,4-dichlorobenzyldithiocarbamate.

3. According to claim 1, the compound which is 2-(2-methyl-5-nitro-1-imidazolyl)ethyl-N-p-chlorobenzyldithiocarbamate.

4. According to claim 1, the compound which is 2-(2-methyl-5-nitro-1-imidazolyl)ethyl-N-p-methoxybenzyldithiocarbamate.

5. According to claim 1, the compound which is 2-(2- methyl-5-nitro-1-imidazolyl)ethyl-N-3,4-dimethoxybenzyldithiocarbamate.

6. According to claim 1, the compound which is 2-(2-methyl-5-nitro-1-imidazolyl)ethyl-N-o-fluorobenzyldithiocarbamate.

7. According to claim 1, the compound which is 2-(2-methyl-5-nitro-1-imidazolyl)ethyl-N-m-methylbenzyldithiocarbamate.

8. According to claim 1, the compound which is 2-(2-methyl-5-nitro-1-imidazolyl)ethyl-N-furfuryldithiocarbamate.

9. According to claim 1, the compound which is 2-(2-methyl-5-nitro-1-imidazolyl)ethyl-N-p-chlorophenethyldithiocarbamate.

10. According to claim 1, the compound which is 2-(2-methyl-5-nitro-2-imidazolyl)ethyl-N-p-methoxyphenethyldithiocarbamate.

11. According to claim 1, the compound which is 2-(2-methyl-5-nitro-1-imidazolyl)ethyl-N-methyl-N-benzyldithiocarbamate.

* * * * *

UNITED STATES PATENT OFFICE
CERTIFICATE OF CORRECTION

PATENT NO. : 3,910,945
DATED : Oct. 7, 1975
INVENTOR(S) : Eunice M. Kreider

It is certified that error appears in the above-identified patent and that said Letters Patent are hereby corrected as shown below:

Column 2, line 50, "1imidazolyl)" should read -- 1-imidazolyl) --.

Column 5, line 9, after "-2-" insert "methyl-5-nitroimidazole in 25 parts by volume of warm di".

Column 7, line 53, "(2methyl" should read -- (2-methyl --.

Column 8, Claim 2, line 59, "(2methyl-5-nitro-5-nitro" should read -- (2-methyl-5-nitro --.

Column 10, Claim 10, line 5, "nitro-2" should read -- nitro-1 --.

Signed and Sealed this seventeenth Day of February 1976

[SEAL]

Attest:

RUTH C. MASON
Attesting Officer

C. MARSHALL DANN
Commissioner of Patents and Trademarks